United States Patent [19]

Shidlovsky et al.

[11] 4,416,789

[45] Nov. 22, 1983

[54] HIGH DENSITY INFORMATION DISC LUBRICANTS

[75] Inventors: Igal Shidlovsky, Princeton, N.J.; William E. Harty, Levittown, Pa.

[73] Assignee: RCA Corporation, New York, N.Y.

[21] Appl. No.: 344,535

[22] Filed: Feb. 1, 1982

[51] Int. Cl.$^3$ ............... B32B 3/02; C10M 3/44
[52] U.S. Cl. .................. 252/34.7; 428/447; 428/900; 369/288; 369/126; 346/137
[58] Field of Search ........... 252/34.7; 369/288, 126; 428/447, 900; 346/137; 585/4

[56] References Cited

U.S. PATENT DOCUMENTS 4,127,872  11/1978  Shen Lo ............... 369/288
4,346,468  8/1982  Preston et al. ......... 369/288

*Primary Examiner*—Jacqueline V. Howard
*Attorney, Agent, or Firm*—Birgit E. Morris

[57] ABSTRACT

High density information discs comprising a conductive carbon-loaded polyvinylchloride disc is lubricated with a fractionated methyl alkyl siloxane lubricant which contains a long chain alkyl substituted betaine.

8 Claims, No Drawings

HIGH DENSITY INFORMATION DISC LUBRICANTS

This invention relates to an improved high density information disc lubricant. More particularly, this invention relates to an improved high density information disc lubricant containing long chain alkyl substituted betaines.

BACKGROUND OF THE INVENTION

U.S. Pat. No. 3,833,408 to Matthies, herein incorporated by reference, describes the application of methyl alkyl siloxane compositions as lubricants for conductive information discs comprising a molded plastic disc having audio and video signal information in the form of geometric variations in a signal track. These discs are coated first with a conductive material, which acts as a first electrode of a capacitor, then with a dielectric layer and a final layer of lubricant. A metallized stylus acts as a second electrode of the capacitor. The information signals are monitored by the stylus which notes changes in capacitance between the stylus and the disc surface as the information signals, in the form of a surface relief pattern, pass beneath the stylus.

Further developments in this system have produced a disc which is made of a conductive plastic material, e.g., a polyvinylchloride homopolymer or copolymer resin containing sufficient amounts of conductive carbon particles so that the disc can provide capacitance readout. The plastic resin at the surface of the disc surrounds the carbon particles to produce a dielectric surface layer. This development has eliminated the need for separate coatings of metal and a dielectric layer on the surface of the disc.

The stylus, formerly made of metallized sapphire, has also been improved so that metallized diamond can be used. Diamond is a harder, longer wearing material than sapphire but also requires improved lubrication of the disc surface.

These changes in the materials used for the high density information discs and the stylus have changed the requirements for the lubricant system and improved lubricants were required. Wang et al., in U.S. Pat. No. 4,275,101, have described an improved lubricant system which comprises a fractionated, purified methyl alkyl siloxane of the formula

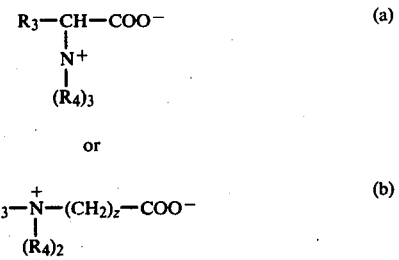

wherein $R_1$ and $R_2$ are alkyl groups of 4–20 carbon atoms, x is an integer of 2–4 and y is an integer of 0–2 and wherein the sum of x and y is 4 or less. These lubricants have improved long term stability and resistance to temperature and relative humidity changes in the atmosphere.

High density information discs of the above type are subject to a phenomenon called carrier distress. Since the polyvinylchloride composition from which the discs are made is a heavily filled, heavily lubricated and heavily plasticized composition, degradation products that are produced during molding and on storage from reactions of the disc materials and excess, incompatible additives, bleed to the surface of the disc, forming a thin layer of organic and inorganic materials. This layer interferes with playback by collecting in the grooves and by building up on the stylus. The result can be locked grooves, or dropouts of information as the disc is played. This problem has been somewhat alleviated by cleaning the discs after molding and prior to lubrication with aqueous solutions which remove at least some of the surface layer. However, with time, additional materials bleed to the surface of the disc. This bleedout can be accelerated by exposure of the disc to high temperatures, on the order of about 100° F., and high relative humidity, 90 percent and above. Lubrication of the disc alone has little effect on reducing carrier distress. However, it would be highly desirable to be able to reduce carrier distress by means of a permanent layer on the disc surface. It would also be desirable to reduce or eliminate the need to clean the disc prior to lubrication.

SUMMARY OF THE INVENTION

We have found that when methyl alkyl siloxane lubricants are doped with long chain alkyl substituted betaine compounds, the carrier distress of high density information discs, after exposure of the discs to high temperature and high relative humidity, is considerably reduced. Further, much improved results are obtained on lubricated, as pressed discs as compared to lubricated, cleaned discs.

DETAILED DESCRIPTION OF THE INVENTION

The long chain alkyl substituted betaines suitable for use herein are selected from the group consisting of betaines of the formula

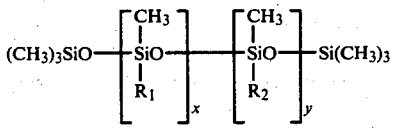

wherein $R_3$ is a long chain alkyl group of 6–20 carbon atoms, $R_4$ is hydrogen or a lower alkyl group of 1–3 carbon atoms and z is an integer.

The above long chain alkyl substituted betaines, when added in small amounts to a methyl alkyl siloxane lubricant, as described hereinabove, greatly improve the stability of high density information discs, particularly after exposure of the disc to high temperature and high relative humidity. The exact reason for this improvement is unknown at the present time.

The amount of long chain alkyl substituted betaine added to the lubricant is not critical and the minimum amount that will be effective to reduce carrier distress is preferred. At the present time dopant amounts of from about 5 to about 20 percent by weight of the methyl alkyl siloxane lubricant has been found to be satisfactory.

The betaine additives described above and the methyl alkyl siloxane lubricant can be mixed together and applied in conventional manner, as by spraying from a mixed solvent, e.g., heptane, in which the methyl alkyl siloxane lubricant is soluble and an alcohol or alcohol mixture in which the betaines are soluble.

The solvent is then evaporated, leaving a film about 200–400 angstroms thick on the surface of the disc. The two materials can also be applied to the disc surface separately but this is less desirable since it requires a separate step.

The improved effect of the present above-described betaines is not obtained for all betaines. For example, a fluorinated betaine, perfluoro alkyl betaine, was found to be ineffective in reducing carrier distress, even though it has good surfactant properties for the other applications.

The present lubricant system, once applied, is stable with respect to atmospheric effects and provides high uniformity and reproducibility for high density information discs. In addition, this system provides excellent lubricity as measured by low stylus and disc wear and improved initial playback performance.

The invention will be further illustrated by the following Examples but the invention is not to be limited to the details described therein. In the Examples, percent is by weight unless otherwise noted.

Carrier distress time is measured by adding the amount of time in seconds (but discounting intervals of less than 10 microseconds) during disc playback when the r.f. output of the player arm is less than 150 millivolts peak to peak, and the time when the r.f. output gives above 8.6 megahertz or below 3.1 megahertz in frequency, indicating a defect. Such defects are noted by the viewer as dropouts. The present acceptable level of carrier distress for a video disc is 3 seconds in one hour of playback time.

EXAMPLE 1

A molding composition was prepared by mixing 78 parts of Geon 110x346 polyvinylchloride of the B. F. Goodrich Company; 13 parts of Cabot 175 carbon black of the Cabot Company; 1.5 parts of dibutyltin-$\beta$-mercaptopropionate commercially available as T35 from M & T Chemical Company, Inc.; 1.0 part of Mark 275 stabilizer of Argus Chemical Co., a dibutyltin maleate stabilizer; 2.0 parts of Acryloid K-147 and 0.75 part of Acryloid K-275, acrylic modifiers of Rohm & Haas Co.; 0.5 part of Loxiol G-30 and 0.25 part of Loxiol G-70 lubricants of Henkel International GmbH; 1.0 part of calcium stearate and 3.0 parts of diundecyl phthalate.

Video discs were compression molded from the above composition at about 360° F. (182.2° C.).

A group of 77 discs was cleaned by washing in a 5 percent aqueous solution of a mixture containing 96.2 mol percent of an alcohol of the formula

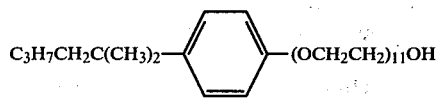

about 3.8 mol percent of 1,2-propanediol and a minor amount of triisopropanolamine, rinsed with deionized water and dried with 1,1,2-trichloro-2,2,1-trifluoroethane, and sprayed with the standard fractionated methyl decyl siloxane lubricant as a 0.3 percent solution in heptane as a control.

A second group of 87 discs that were not precleaned were sprayed with a solution containing 0.3 gram of methyl decyl siloxane and 0.02 gram of a betaine of the formula

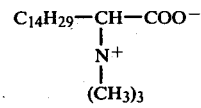

in a mixture of 80 mls of heptane, 10 mls of propanol-2 and 10 mls of methanol.

The discs were played once, then stressed by maintaining in a chamber held at 100° F. and 95 percent relative humidity for 3 hours and replayed. Carrier distress was measured for 30 minutes of playback. The data are summarized below in Table I.

TABLE I

|  | Range | Median |
|---|---|---|
| Initial Play |  |  |
| Control | 0.0–285 | 0.3 |
| Example 1 | 0.04–6.3 | 0.06 |
| After First Stress |  |  |
| Control | 0.1–1448 | 3.8 |
| Example 1 | 0.06–13.3 | 0.3 |
| After Second Stress |  |  |
| Control | 0.1–1448 | 8.0 |
| Example 1 | 0.06–14.7 | 1.3 |

EXAMPLE 2

The procedure of Example 1 was followed except that the betaine employed had the formula

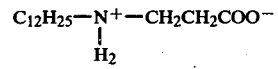

and the solvent solution was made of 80 mls of heptane and 20 mls of propanol-2.

The carrier distress results are summarized below in Table II.

TABLE II

|  | Carrier Distress, secs |
|---|---|
| Initial Play |  |
| Range | 0.04–0.48 |
| Median | 0.11 |
| After First Stress |  |
| Range | 0.06–72.8 |
| Median | 1.8 |
| After Second Stress |  |
| Range | 0.6–4.7 |
| Median | 0.27 |

EXAMPLE 3

This Example demonstrates the superiority of the present betaine doped lubricant over the lubricant alone, particularly for as pressed discs.

Video discs made as in Example 1, cleaned and dried, were lubricated with the lubricant alone (Control) and the lubricant plus betaine dopant. Carrier distress results are summarized below in Table III.

TABLE III

|  | Control | Doped Lubricant |
|---|---|---|
| Initial Play |  |  |
| Median | 0 | 0.6 |
| Range | 0–2.4 | 0–1.4 |
| # Pass | 12/12 | 12/12 |

TABLE III-continued

|  | Control | Doped Lubricant |
|---|---|---|
| After First Stress |  |  |
| Median | 5 | 1.0 |
| Range | 0-124 | 0.2-5.4 |
| # Pass | 4/12 | 10/12 |
| After Second Stress |  |  |
| Median | 8.2 | 0.4 |
| Range | 2-66 | 0.2-16 |
| # Pass | 2/12 | 9/12 |

The test was repeated on as pressed discs. The carrier distress results are summarized below in Table IV.

TABLE IV

|  | Control | Doped Lubricant |
|---|---|---|
| Initial Play |  |  |
| Median | 0 | 0.2 |
| Range | 0-0.1 | 0-1.0 |
| # Pass | 12/12 | 12/12 |
| After First Stress |  |  |
| Median | 104 | 1.6 |
| Range | 18-524 | 0.2-8.4 |
| # Pass | 0/12 | 7/12 |
| After Second Stress |  |  |
| Median | 64 | 0.6 |
| Range | 22-306 | 0.2-4.6 |
| # Pass | 0/12 | 11/12 |

CONTROL EXAMPLE

The procedure of Example 1 was followed except substituting as the dopant a fluorinated betaine of the formula

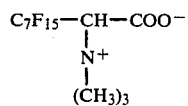

The carrier distress results are given below in Table V and compared to a group of 6 discs treated with the fractionated methyl decyl siloxane lubricant alone. The data below are normalized to 1 hour of playback time.

TABLE V

|  | Median | Range | # Pass |
|---|---|---|---|
| Initial Play |  |  |  |
| Example | 1.3 | 0.2-8.1 | 4/6 |
| Control | 0.3 | 0.1-8.1 | 4/6 |
| After First Stress |  |  |  |
| Example | 226 | 145-373 | 0/6 |
| Control | 97 | 36-187 | 0/6 |

Thus the fluorinated betaine did not improve the carrier distress results over the Control.

We claim:

1. In a high density information record adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record coated with a methyl alkyl siloxane lubricant having the formula

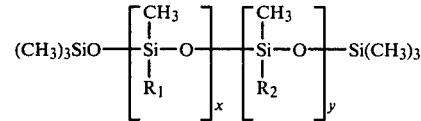

wherein $R_1$ and $R_2$ are alkyl groups of 4-20 carbon atoms, x is an integer of 2-4, y is an integer of 0-2 and wherein the sum of x plus y is 4 or less, the improvement which comprises adding to said lubricant a long chain alkyl substituted betaine selected from the group consisting of

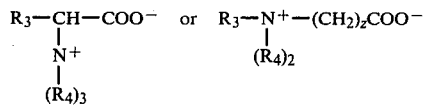

wherein $R_3$ is a long chain alkyl group of 6-20 carbon atoms, $R_4$ is hydrogen or alkyl of 1-3 carbon atoms and z is an integer.

2. A record according to claim 1 wherein said betaine has the formula

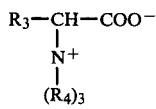

3. A record according to claim 2 wherein $R_3$ is $C_{14}H_{29}$ and $R_4$ is methyl.

4. A record according to claim 1 wherein said betaine has the formula

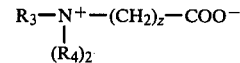

5. A record according to claim 4 wherein $R_3$ is $C_{12}H_{25}$ and $R_4$ is hydrogen.

6. A record according to claim 1 wherein from about 5 to about 20 percent by weight of the lubricant of the betaine is present.

7. A record according to claim 1, 2 or 4 wherein said disc is made of a conductive carbon-containing polymer or copolymer of polyvinylchloride.

8. In a capacitance electronic disc having a methyl alkyl siloxane lubricant coating thereon, said lubricant having the formula

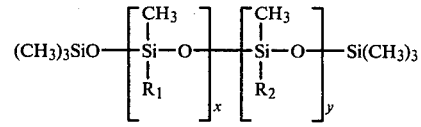

wherein $R_1$ and $R_2$ are alkyl groups of 4-20 carbon atoms, x is an integer of 2-4, y is an integer of 0-2 and wherein the sum of x plus y is 4 or less, the improvement which comprises adding to said lubricant a long chain alkyl substituted betaine selected from the group consisting of

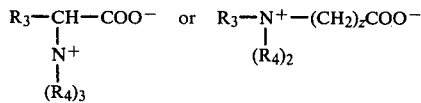

wherein $R_3$ is a long chain alkyl group of 6-20 carbon atoms, $R_4$ is hydrogen or alkyl of 1-3 carbon atoms and z is an integer.

* * * * *